(12) United States Patent
Van Acquoij

(10) Patent No.: US 9,710,203 B2
(45) Date of Patent: Jul. 18, 2017

(54) APPARATUS AND METHOD FOR DEFECT DETECTION IN A PRINTING SYSTEM

(71) Applicant: OCE-TECHNOLOGIES B.V., Venlo (NL)

(72) Inventor: Catharinus Van Acquoij, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 23 days.

(21) Appl. No.: 14/877,549

(22) Filed: Oct. 7, 2015

(65) Prior Publication Data

US 2016/0103634 A1 Apr. 14, 2016

(30) Foreign Application Priority Data

Oct. 8, 2014 (EP) .................................... 14188097

(51) Int. Cl.
*B65H 43/04* (2006.01)
*G06F 3/12* (2006.01)
(Continued)

(52) U.S. Cl.
CPC .............. *G06F 3/121* (2013.01); *B41J 29/38* (2013.01); *B65H 7/06* (2013.01); *G06F 3/1234* (2013.01); *G06K 15/16* (2013.01); *G06T 7/0002* (2013.01); *H04N 1/00002* (2013.01); *H04N 1/00681* (2013.01); *B65H 2511/20* (2013.01); *B65H 2511/24* (2013.01); *B65H 2511/413* (2013.01);
(Continued)

(58) Field of Classification Search
CPC ..... B41J 11/007; B41J 11/009; B41J 11/0095; B41J 11/42; B41J 3/60; G03G 2215/00662; G06F 3/121
See application file for complete search history.

(56) References Cited

U.S. PATENT DOCUMENTS 5,654,799 A * 8/1997 Chase .................... G01N 21/86
356/429
6,259,888 B1 * 7/2001 Kazama ................. B65H 29/12
271/183
(Continued)

OTHER PUBLICATIONS

Anonymous: "Images and Pixels \ Processing .org", Archived Website: https://www.processing.org/tutorials/pixels/, Aug. 18, 2014, pp. 1-12, XP055179251, https://web.archive.org/web/20140818065123/http://www.processing.org/tutorials/pixels, retrieved on Mar. 25, 2015, the whole document.

*Primary Examiner* — David Banh
(74) *Attorney, Agent, or Firm* — Birch, Stewart, Kolasch & Birch, LLP

(57) ABSTRACT

An apparatus for defect detection in a printing system, comprising a sensor device for sensing a surface of a sheet and for generating data representing a height map of the sheet, and a processor device for processing the data from the sensor device, wherein the processor device is configured to analyze the height map to detect a presence of a deformation in the sheet. The processor device is further configured to, when a deformation is detected, to determine at least one property of the deformation, to classify the deformation with respect to a plurality of deformation classes by means of the at least one property of the deformation, and to determine a suitability of the sheet for printing based on the deformation class wherein the deformation has been classified.

15 Claims, 6 Drawing Sheets

(51) Int. Cl.
  *B65H 7/06*     (2006.01)
  *G06T 7/00*     (2017.01)
  *H04N 1/00*     (2006.01)
  *B41J 29/38*    (2006.01)
  *G06K 15/16*    (2006.01)
  *G03G 15/00*    (2006.01)

(52) U.S. Cl.
  CPC .... *B65H 2511/51* (2013.01); *B65H 2511/522* (2013.01); *B65H 2553/414* (2013.01); *B65H 2553/42* (2013.01); *B65H 2557/23* (2013.01); *G03G 15/5029* (2013.01); *G03G 2215/00721* (2013.01); *G06T 2207/30144* (2013.01)

(56) References Cited

U.S. PATENT DOCUMENTS

| | | | |
|---|---|---|---|
| 6,504,617 B2 | 1/2003 | Komulainen et al. | |
| 7,496,413 B2* | 2/2009 | Fan | G05B 13/042 162/198 |
| 7,554,574 B2 | 6/2009 | Shoji et al. | |
| 8,454,111 B2* | 6/2013 | Hayashi | B41J 11/007 347/14 |
| 8,538,316 B2* | 9/2013 | Shigeno | G03G 15/652 271/188 |
| 8,542,260 B2* | 9/2013 | Tsuchihashi | B65H 7/06 347/179 |
| 8,870,331 B2* | 10/2014 | Mo | B41J 11/46 347/16 |
| 9,109,330 B2* | 8/2015 | Shakespeare | D21G 9/0009 |
| 2004/0100016 A1* | 5/2004 | Lay | B65H 29/60 271/225 |
| 2005/0133990 A1 | 6/2005 | Mukai | |
| 2005/0200918 A1* | 9/2005 | Muller | G06T 7/0073 358/496 |
| 2006/0275045 A1* | 12/2006 | Kawasaki | G03G 15/5029 399/45 |
| 2008/0122166 A1* | 5/2008 | Fukube | B65H 7/14 271/265.01 |
| 2009/0180163 A1 | 7/2009 | Cornell | |
| 2011/0279507 A1 | 11/2011 | Castillo et al. | |
| 2012/0127480 A1 | 5/2012 | Pilloud et al. | |
| 2014/0054845 A1* | 2/2014 | Morikawa | B65H 5/00 271/18 |
| 2014/0092159 A1* | 4/2014 | de Jong | B41J 11/0095 347/16 |
| 2014/0348413 A1* | 11/2014 | Hecht | G07D 11/0084 382/135 |
| 2016/0129709 A1* | 5/2016 | Nolting | B41J 13/0009 347/104 |

* cited by examiner

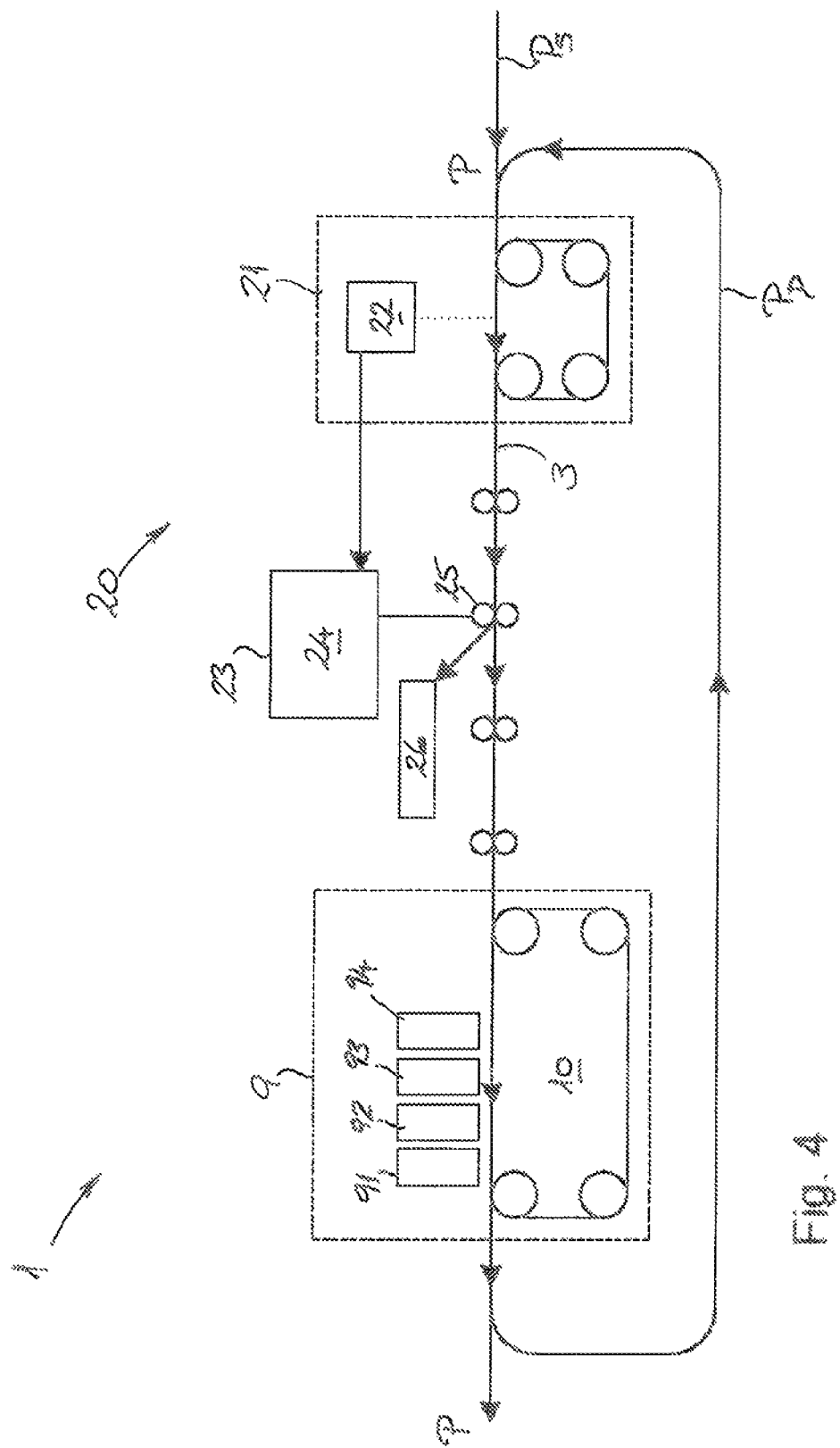

APPARATUS AND METHOD FOR DEFECT DETECTION IN A PRINTING SYSTEM

FIELD OF THE INVENTION

The present invention relates to an apparatus and method for detecting a defect in a printing system, such as an inkjet printing system. The invention also relates to a printing system that includes such a defect detection apparatus to improve and/or optimize productivity and error handling of the system.

BACKGROUND OF THE INVENTION

One or more deformations present within a sheet of a medium to be printed can cause serious reliability problems in a printing system, such as an inkjet printing system, especially if there is only a small gap provided between a sheet transport mechanism and an image forming device or printing head of the printing system. If the sheet to be printed touches the image forming device or the printing head as a result of such a deformation, this can lead to print quality degradation and/or to a sheet jam in the machine.

To address these issues, systems have been developed which employ a proofing device capable of identifying sheet deformations and rejecting sheets that contain such deformations. However, there are many sources of defects or errors that may lead to sheets being rejected which degrade the productivity of a printing system. For example, the sheets to be printed supplied to a printing machine may already contain various defects. Also, defects and wear within the machine can cause the sheets to become damaged. Changes in the environmental conditions can lead to deformation of the sheets as they are being processed, and inappropriate settings in a printing system, such as too much ink or a drying temperature that is too high, can also generate problems. Furthermore, such influences or defects can act in combination, making it very difficult to identify a root cause of a problem.

Defect detection units for a printing system known from the prior comprise a detector for sensing a single type of defect, for example a wrinkle detector or a dog ear detector. Based on the presence of a defect, a signal is emitted, indicating that the sheet is unsuited for printing. Sheets comprising a variety of defect types are often incorrectly designated as either suited or unsuited via the defection detection units in the prior art.

US2004100016 A describes a media qualification device wherein sheets may be sorted among a plurality of usable media paths according to media grade. The media qualification device may further comprise an input/output device configured to select media grade parameters.

SUMMARY OF THE INVENTION

In view of the above, an object of the present invention is to provide a new and improved apparatus and method for detecting defects in a printing system, such as an inkjet printer, and a printing system or machine including such an apparatus.

In accordance with the invention, a defect detection apparatus having the features recited in claim 1 and a method as recited in claim 15 are provided. Advantageous and/or preferred features of the invention are recited in the dependent claims.

In a first aspect, the invention relates to an apparatus for defect detection in a printing system, comprising a sensor device for sensing a surface of a sheet to be printed and for generating data representing a height map of the sheet. The sensor device is preferably arranged for scanning the surface of the sheet for producing a 3D-image or height map. Such a sensor device can be for example be an optical scanner, such as a 3D camera or interferometer, and is positioned upstream from an image forming unit, such as a print head. The sensor device measures a height map of the sheet as the sheet is transported along the transport path towards an image forming unit, preferably without impeding the transport of the sheet along the transport path.

The apparatus further comprises a processor device for processing the data from the sensor device. This data can be digital or analogue and is send to the processing device either via a wired or wireless connection. Basically, the sensor device measures the raw data describing the height map of the sheet surface and sends this to the processing unit, which for example is a computer, for analysis.

The processor device is configured to analyse the height map to detect a presence of a deformation in the sheet. When no defect is present, the sheet is deemed to be completely smooth and suited for printing. The processor device checks, preferably initially, whether a defect is present on the sheet by analyzing the height map, preferably by looking for a deviation or abnormality in the height map. This can for example be done by comparing the maximum height of the height map to the average height of the height map.

When a deformation is detected, the processing unit is arranged to determine at least one property of the deformation. The processing device analyzes the height map data for a deformation to determine for example, the maximum height and/or the position of the center of gravity of the deformation.

The processing device is further arranged to classify the deformation with respect to a plurality of deformation classes by means of the at least one property of the deformation. The deformation classes are for example dog ear, wrinkle, and tear. The at least one property allows the processing device to assign a specific class to a detected deformation by comparing the at least one property of the deformation to pre-defined selection criteria for that class. For example, when the position of the maximum height within a bounding box drawn around the deformation has been determined, it is classified as a dog ear if the maximum height position is located at the corner of the bounding box, or it is classified as a wrinkle if the maximum height position is near the middle of one of the vertices of the bounding box. Other properties can be applied to classify deformations into additional classes.

The processing device is further arranged to determine a suitability of the sheet for printing based on the deformation class in which the deformation has been classified. When certain deformation classes are unwanted, the processing device deems a sheet unsuited for printing when a deformation of said class is detected and classified into said deformation class. For example, when a user desires no dog ears on his printed sheets, sheets wherein the processing unit classifies a deformation to be of the dog ear class are identified as unsuited for printing. These dog eared sheets can then be ejected from the printing device by the user or by an ejection system or ejector device connected to the processor device. The apparatus according to the present invention is thus arranged to detect and classify a wide range of deformations in a sheet. Classifying the defects allows for an accurate determination of the suitability for printing of a sheet. Additionally, the system allows for flexibility in its detection, classifying and suitability criteria, which can de adjusted to the preferences of a user. Deformation classes and/or properties to be determined can be added or removed and the classifying criteria can be adjusted, for example when the sheet media or conditions change. Thereby, a highly accurate apparatus for detecting defects is provided.

In an embodiment, the processor device is further arranged to determine a suitability of the sheet for printing based on at least one property of the deformation and/or the deformation class of the deformation. For example, when the processor device detects that the maximum height exceeds a predetermined threshold, such as the print head gap spacing, a sheet may be identified as unsuited for printing without the need for further classification of deformations.

Additionally, not only the classification of deformations may be taken into account by the processor device when determining suitability, but also the respective sizes of the determined properties. For example, a user might permit sheets with wrinkles to be printed when the wrinkle size is very small. Alternatively, a user might define different classes with deformations deeming a sheet suited and respectively unsuited for printing, such as a class of small wrinkles and a class of large wrinkles. Basically, the selection criteria for printing suitability are determined by the deformation classification and/or the at least one property of the deformation. This allows for an accurate determination of the printing suitability of a sheet.

In an embodiment, the processor device is further arranged to determine at least one property for each of the plurality of deformations, when a plurality of deformations is detected. Basically, the above described process is repeated for each detected deformation. The plurality of deformations is classified by the processor device with respect to the plurality of deformation classes by means of the at least one property of each of the plurality of deformations. Thus, each deformation detected is classified by the processor device. A suitability of the sheet for printing is then determined based on the plurality of deformations classes in which the deformation have been classified. Suitability may as such be determined based on a distribution of the detected deformations over the deformation classes. The number of deformations classified into each deformation class is weighted by the processor device in its decision on the suitability of a sheet. For example, the processor device might be arranged to reject a sheet when the deformation distribution over the classes exceeds one dog ear-type defect or two wrinkle-type defects. The distribution allows for dynamic rejection criteria, suited to the needs of a user or specific print jobs.

In an embodiment the processor device is arranged to classify the deformation by respectively comparing the at least one property of the deformation to at least one predetermined reference corresponding to a deformation class. Each class is uniquely identifiable by the processor device by at least one reference. The reference may comprise selection criteria, one or more ranges, and/or reference values. For example, when a property of a deformation is determined, its value is compared by the processor device to lie above or below a comparison value stored in the processor device. When the value of the property lies below this comparison value, the deformation is categorized into class $C_1$, whereas when the value of the property lies above this comparison value, the deformation is categorized into a different class $C_2$. Alternatively, each class is identifiable via a plurality of references for each property. For example, for each determined property P, the processor device compares it to a plurality of references, such as reference $R_1$ (e.g. 0 to 40%) for class $C_1$, reference $R_2$ (e.g. 40 to 80%) for class $C_2$, and reference $R_3$ (e.g. 80 to 100%) for class $C_3$. In the example above, if property P were 50%, the deformation for which property P was determined would be classified as $C_2$-type. When the value of property P lies in the respective reference, the deformation for which the property P was determined is classified into the class corresponding to that reference. The use of references allows for a dynamic and accurate classification on the basis of determined property.

In an embodiment the processor device is further configured to determine a plurality of properties of the deformation, when a deformation is detected. For example, maximum height, area, bounding box properties, position of the center of gravity within the bounding box, gradients can be determined. The deformation is then classified with respect to a plurality of deformation classes by respectively comparing each of the plurality of properties of the deformation to a plurality of predetermined references of at least one of the plurality of deformation classes. For example properties $P_1$, $P_2$, $P_3$ are determined per detected deformation. Class, $C_1$ for example, corresponds to a plurality of references $R_{C1-P1}$, $R_{C1-P2}$, $R_{C1-P3}$; one reference $R_{Ci-Pj}$ for each property $P_j$ for the respective class $C_i$. A deformation is classified as $C_1$ if property $P_1$ lies within reference $R_{C1-P1}$, property $P_2$ lies within reference $R_{C1-P2}$, and property $P_3$ lies within reference $R_{C1-P3}$. Preferably, the processor device applies an algorithm for sorting the deformation into the respective classes based on their determined properties.

Each of the plurality of deformation classes is uniquely identifiable by means of its corresponding plurality of ranges. A deformation class can correspond to physical sheet deformation, such as wrinkles and dog ears, but the user is free redefine sub-classes, such as the above mentioned large and small wrinkle classes. Additionally, a collective class might be defined for deformations not corresponding to other predefined deformations classes and stored for a separate analysis. Optionally, the processing device might contain an auto-learning algorithm for improving its classification abilities during continued operation. Determining multiple properties per deformation and linking these to a class, preferably via predefined references, allows the apparatus according to the invention to classify a wide variety of defects. It also allows a user (or an automated ejector device connector to the apparatus) to take different actions on the basis of the deformation distribution.

In an embodiment, the processor device is arranged for determining the suitability of the sheet by comparing the at least one property of the deformation and/or the plurality of deformation classes in which the deformations have been classified to at least one threshold value. The threshold value might be related to the print head gap spacing and the at least one property the maximum height of a deformation. Should the maximum height of a deformation on a sheet exceed the print head gap spacing, the sheet is rejected. A threshold value can alternatively or additionally correspond to a maximum desired number of deformations in a class. For example, when no more than one wrinkle per sheet is desired the threshold for the number of deformations in the wrinkle class is set to 1. When a distribution (or classification) of deformations into the wrinkle class exceeds the threshold, the sheet is deemed unsuited for printing. A threshold can be defined for one or more properties determined for a sheet, but needed be defined for all determined properties. The application of a threshold allows for a quick and efficient determination of the suitability of a sheet for printing. This is especially beneficial in a high capacity printing system with an ejector device, wherein the sheets are transported at relatively high speed. The time wherein the sheet travels between the sensor device and the ejector device is very short and requires a rapid analysis of the height map data and determination of the suitability for printing. The apparatus according to the present invention has the advantage of being able rapidly execute the analysis for suitability to timely instruct the ejector device to eject a sheet, if deemed unsuited by the analysis.

In an embodiment the apparatus according to the invention further comprises a memory unit for storing sheet information related to a sensed sheet, for example a database or data table. The sheet information comprises data representing a height map of the sheet. This can be the data as measured by the sensor device. The sheet information can comprise values for the at least one property determined for the sheet. For example, the values determined for maximum height or the position of the center of gravity.

Additionally the memory unit may store the plurality of deformation classes in which the deformations have been classified for the sheet. This allows the processor to track and analyze the deformation distribution over multiple sheets, for example for statistical analysis. For each sensed sheet surface the memory unit can store pass information representative of a path taken and/or to be taken by the sheet through the printing system. This allows the processor unit to identify whether a to be printed/sensed sheet is intended for simplex or duplex printing and whether or not a side of the sheet has yet been printed. The sheet information can thus further comprise information indentifying the trajectory of a sensed sheet for a simplex or duplex printing of the sheet.

The memory unit may store the at least one predetermined reference corresponding respectively at least one property. In this manner a database with classification information is formed allowing the processing device to classify the deformation via comparison to said database. At least one algorithm is stored on the memory unit or processing device for classifying a deformation based on its at least one determined property. Also, the at least one threshold value might be stored. Preferably operating conditions related to treatment of the sheet can be stored on the memory unit.

The processing device is preferably arranged analyze and relate the deformation distributions recorded over time to the operating conditions information. This allows a user to optimize sheet print and/or pre-treatment conditions and to possibly rule out undesired condition before hand. The processing device might be arranged to emit a signal when operating conditions which in the past have resulted in significantly large amounts of deformations are selected by the user.

The memory unit might store information relating to the at least one property of the deformation and/or the plurality of deformation classes in which the deformations have been classified to one or more root causes. Specific combinations of distributions and/or properties might be linked to underlying toot causes, such as faulty operating conditions. As such, apparatus can log and track the measured properties and deformations over time. The automated detection of root causes by the processor unit aids the user in swiftly and efficiently overcoming production stops. For example, a dog ear if formed on a majority of sheets in a to be printed sheet stack, because the stack has been dropped on the floor before loading into the printing system. The processor device will identify the presence of a dog ear in several consecutive sheets. This triggers the processor device to emit a signal to the user indicating that the remainder of the sheet stack might also comprise dog ear. The user can then replace the sheet stack and resume printing. Alternatively, the processing unit can for example point out to the user that a operating condition such as an amount of ink coverage or humidity in the machine in the past resulted in the presence of wrinkles in the to be printed sheets, when this operating condition is set by the user. Thus, the processing unit can access root cause information in the database to determine whether current deformation distributions or printing conditions match criteria in the database which link said distributions or printing conditions to a root cause. The user is then swiftly and accurately informed of the underlying of a problem in the printing system, thereby reducing the down time of the printing system.

In an embodiment, the processor device is arranged to connect to the memory unit to analyse and/or compare sheet information for a plurality of sensed sheets. As explained above the deformations distributions, deformations properties, operating conditions, and/or job settings of multiple sensed sheets can be analyzed for example by statistical analysis and any abnormalities might be pointed out to a user via a signal emitted by the processor device. Using root cause information the processor device can identify underlying root causes by tracking the deformation distribution over multiple sheets.

In an embodiment, the processor device is arranged to emit a signal for identifying of a root cause based on the at least one property of the deformations and the plurality of deformation classes in which the deformations have been classified. The signal might be given via user interface connected to the processor device. When the deformation properties and/or distribution of an individual sheet or a series of sheets match a root cause criterion stored on the processor device or memory unit, the user is notified via a signal on the user interface. Preferably, instructions regarding solving the problem of the root cause are provided with this signal. This allows a user to respond efficiently to the problem related to the root cause.

In an embodiment, the plurality of deformations classes comprises at least one of the group comprising wrinkles, dog ears, curl, and tears. Other deformation classes can be added based on the sheet material which is applied and/or the user's preferences.

In an embodiment, the at least one property comprises at least one of the group comprising maximum height, defect area, bounding box, and centre of gravity for a deformation. The processor device is arranged to derive the above properties from the height map data for each defect detected. Additional properties can be defined by the user.

In an embodiment, the sensor device is arranged to sense the surface geometry of the sheet when the sheet is on a first pass of the transport path towards an image forming unit of the printing system for generating first pass data representing a height map of the sheet. The sensor device detects the height map of a first side of the sheet, which side is then printed by the image forming unit. The sensor device is further arranged to sense the surface geometry of the sheet when the sheet is on a second pass of the transport path towards the image forming of the printing system for generating second pass data representing a height map of the sheet. When the sheet is intended for duplex printing the second (preferably blank) side of the sheet is sensed by the sensor device before the sheet re-enters the image forming unit. This allows the processor device to identify any deformations which were added to the sheet on during its second pass (i.e. between the first and second sensing of the sheet by the sensor device).

In an embodiment, the first pass data represents a height map of a first side of the sheet, and wherein the second pass data represents a height map of a second side of the sheet. By comparing the height maps of either side of the sheet the processor device can identify the occurrence of deformations between the first and second sensing of the sheet by the sensor device.

In an embodiment, the processor device is arranged to compare the properties of the deformations and the plurality of deformation classes in which the deformations have been classified determined from the first and second pass data to one another. Preferably the processor device emits a signal indicative of a difference in the one or more properties of the deformations and the distribution of the deformations over the plurality of deformation types determined from the first and second pass data with respect to one another. The apparatus according to the present invention can apply different suitability criteria for the first and the second pass. For duplex printing the at least one threshold might be set to a stricter level than for the second pass. The processing device is preferably arranged for comparing the second pass data to the first pass data. This allows the processor device to identify if any deformations are added to the sheet on its second pass. The processing unit then might emit a signal to the user, such that the transport path of the second pass can be inspected.

In an embodiment, the present invention provides an apparatus for detecting a defect in a printing system, comprising:
  a sensor device for sensing a surface geometry or topology of a sheet to be printed and for generating data that is representative of that surface geometry or topology; and
  a processor device for processing the data from the sensor device, wherein the processor device is configured to detect and to classify deformations in the surface geometry or topology of the sheet to determine a suitability of the sheet for printing.

In this way, the invention provides an apparatus or device for sheet deformation measurement which is capable of measuring the surface shape of the sheet. By analysing the sheet shape data, any deformations or defects in the sheet and their properties can be identified or extracted from the data. Further, a classification can be made for each deformation or defect found within the sheet; for example, a type or shape classification (e.g. "dog ear", curl, or waviness) and/or size classification. The data from the detection and classification of the deformations may then be used for finding a root cause or root defect in the printing system and/or can be used for monitoring of the system performance. Especially humidity problems and wear of the system will show a gradual defect build up. Preventive measures can be taken to maintain system performance. As the apparatus of the invention employs data representative of the surface geometry or topology of the sheet (i.e. three-dimensional data), the invention is capable of detecting multiple deformation types. Any deformation present within the sheet can be detected by using a full sheet topology measurement, i.e. a 3D image of the sheet.

In a particularly preferred embodiment, the sheet to be printed is a sheet of a print medium comprised of paper, or a polymer film, such as a polyethylene (PE) film, a polypropylene (PP) film, a polyethylene terephthalate (PET) film, or a metallic foil, or a combination of two or more thereof.

In a preferred embodiment of the invention, the processor device is configured to detect and classify deformations in the surface geometry or topology of the sheet to determine whether a deformation identified exceeds a threshold size to thereby render the sheet unsuitable for printing. Alternatively, or in addition, the processor device is configured to detect and classify deformations in the surface of the sheet for statistical purposes to determine print media reliability. In this regard, the data is analysed by the processor device to determine any one or more of: a number of deformations present within a sheet, a height of each deformation, and area of each deformation. In this way, the apparatus for sheet topology measurement and defect detection and classification may also be used to create test methods for determining the run-ability of print media and optimizing the print and processing parameters depending on the medium used; e.g. the maximum ink coverage that can be used on a certain medium type.

In a preferred embodiment, the sensor device is configured and arranged to sense the surface geometry or topology of the sheet when the sheet is on a transport path of the printing system. The apparatus may further comprise an ejector device for removing the sheet from the transport path of the printing system if and when the processor device determines that the sheet is unsuitable for printing. In this regard, a sheet may be determined as unsuitable for printing if, for example, a deformation detected has a particular shape classification (e.g. "dog ear", curl, or waviness) and/or a particular size classification; e.g. if the deformation detected exceeds a threshold size. The processor device is preferably configured to control the ejector device for removing the sheet from the transport path depending upon the processing of the surface geometry or topology data. Thus, the apparatus for measuring sheet deformation is also used for rejecting sheets from the paper path to enhance printing reliability.

The printing system may be designed for a single-pass of the print medium sheets through an image forming device or for multi-pass image formation. In a preferred embodiment, the sensor device of the apparatus is configured and arranged to sense the surface geometry or topology of the sheet when the sheet is on a first pass or simplex pass of the transport path towards an image forming device or a printing head unit of the printing system. In the event the printing system employs multi-pass image formation, the sensor device of the apparatus may be configured and arranged to sense the surface geometry or topology of the sheet each time the sheet makes a pass of the transport path towards the image forming device or printing head unit of the printing system. For example, in a duplex-pass printing system, the sensor device is configured and arranged to sense a surface geometry or topology of the sheet is on both the first pass or simplex pass as well as on the second pass or duplex pass. The moment in time at which a sheet deformation or defect appears within the printing process and the shape and/or size of that deformation or defect can help to determine the cause of that defect. For example, if a pack of paper print medium sheets is dropped before being fed into a printing system, the associated defects in the paper will appear directly at a simplex pass proofing. In such a case, where a sheet is identified as having a dog-eared corner, it is highly probable that many subsequent sheets will also have a dog ear at one of the corners of the sheet. In another example, if the duplex sheet transport mechanism in the printing system is defective, the sheets may become damaged during the duplex pass. In such a case, the location of the defect in the duplex pass may be confirmed by the simplex pass sheet analysis showing that the sheet was not damaged at that time. In a further example, changes in humidity tend to cause very specific waviness deformations in a sheet that can readily be distinguished from dog ears and curl defects.

In a preferred embodiment, the sensor device is configured to sense substantially an entire surface or side of the sheet, preferably via an optical scanner such as a laser scanner. In this way, the surface geometry or topology data typically includes image data comprising pixels. The processor device is preferably configured to detect and classify deformations in the surface geometry or topology of the sheet according to at least one of a plurality of criteria including: height (e.g. in mm), area (e.g. in pixels), bounding area (e.g. in pixels), and/or centre of gravity in the surface geometry or topology data processed. To this end, the processor device typically employs at least one algorithm for processing or analysing the surface area or topology data from the sensor device. In particular, a reliable deformation or defect classification which is independent of the defect size and shape can be accomplished by a recognition algorithm using defect property parameters that are independent of the type of deformation. These preferably include: a bounding box (i.e. drawn around the deformation), an area of the defect or deformation, centre of gravity, and maximum height and position of the defect or deformation.

In a particularly preferred embodiment, the at least one algorithm is configured to analyse an array of pixels in the surface geometry or topology data (image data) row-by-row according to at least one criterion, such as height, to identify and to classify a deformation in the sheet. Further, the algorithm may be configured to analyse neighbouring pixels of a pixel within a deformation.

A classification algorithm for classifying a detected defect or deformation in the present invention typically uses simple to calculate properties like a bounding box (i.e. drawn around a deformation), an area of a deformation, centre of gravity, and maximum height and position of the defect or deformation. These properties are generally easy to calculate in real time. The dog ear type of defect or deformation has a unique property that the maximum height is located at the corner of the bounding box, which is located at the corner of the sheet. The maximum height of a wave type of defect or deformation is located in the middle of one of the vertices of the bounding box, which in turn is located at one of the edges of the sheet. It will be appreciated that other algorithms, e.g. employing correlation techniques, can also be used but these may be much more computation intensive and sensitive to the actual defect shape and size.

According to yet another aspect, the invention provides a method of detecting defects in a printing system, comprising:

sensing a surface geometry of a sheet to be printed to generate data representing a height map of the sheet;
analyzing the height map to detect a presence of a deformation in the sheet;
when a deformation is detected, determining at least one property of the deformation;
classifying the deformation with respect to a plurality of deformation classes by means of the at least one property of the deformation;
determining a suitability of the sheet for printing based on the deformation class in which the deformation has been classified.

By analyzing the height map for detecting and classifying the deformations, an accurate determination of the sheet's suitability for printing is achieved. By classifying the detected deformations into classes a accurate and versatile method of defect detection is provided.

In an embodiment, the invention provides a method of detecting defects in a printing system, comprising:

sensing a surface geometry or a topology of a sheet to be printed thereby to generate data, especially digital data, representative of that surface geometry or topology;
processing the surface geometry or topology data from the sensor device to detect and classify deformations in the surface geometry or topology of the sheet; and
determining suitability of the sheet for printing in the system based upon the deformations detected and classified in the surface geometry or topology of the sheet.

As noted above, in a preferred embodiment the step of determining suitability of the sheet for printing comprises determining whether a deformation detected has a particular classification, e.g. a size or shape classification. For example, the method may determine that a detected deformation exceeds a threshold size and thus renders the sheet unsuitable for printing.

In a preferred embodiment, the step of sensing the surface geometry or topology of the sheet takes place on a transport path of the sheet in the printing system, and the method further includes: removing or ejecting the sheet from the transport path of the printing system if and when a deformation identified is determined to exceed the threshold size.

As also discussed above, the printing process may comprise a single-pass of the print medium sheets through an image forming unit or, alternatively, a multi-pass process for image formation. In a preferred embodiment, the step of sensing the surface geometry or topology of the sheet takes place on a first pass or simplex pass of the sheet on the transport path towards an image forming unit or a printing head unit of the printing system. In a multi-pass (e.g. duplex) printing process, the step of sensing the surface geometry or topology of the sheet preferably takes place on each pass of the transport path by a sheet of print medium towards the image forming device or printing head unit of the printing system. In this regard, the sensing step preferably includes sensing the surface geometry or topology of substantially an entire surface or side of the sheet. This sensing operation may, for example, be performed by an optical scanner such as a laser scanner. As such, the surface area or topology data typically includes image data comprising pixels.

In a preferred embodiment, the processing step comprises applying at least one algorithm to the surface area or topology data. The at least one algorithm may be configured to analyse pixels of the data row-by-row (or by row major) according to at least one criterion, such as height, to identify and classify deformations in the sheet. In this context, the algorithm preferably analyses neighbouring pixels of a pixel detected within a deformation.

According to a further aspect, the present invention provides a printing system comprising a defect detection apparatus according to any one of the embodiments described above for performing a method of detecting defects according to any one of the embodiments described above.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which:

FIG. 4 is a schematic side view of a printing system with a defect detection system according to an embodiment of the invention;

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION OF EMBODIMENTS

Figure 1:
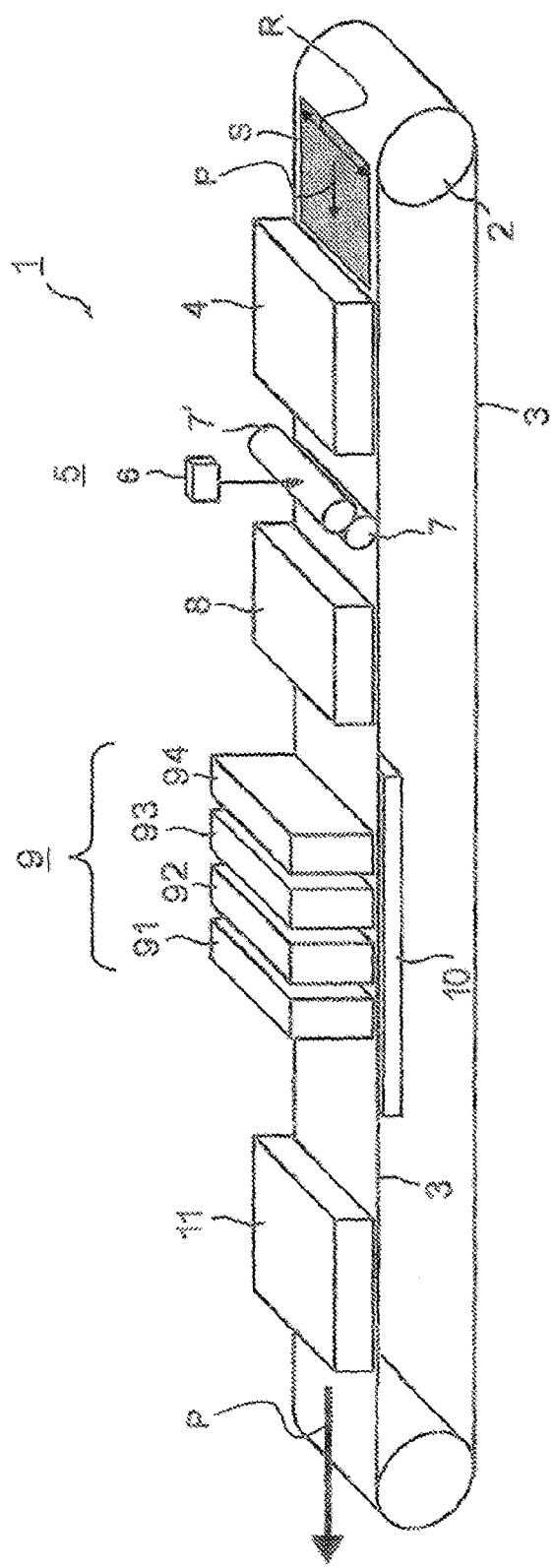
FIG. 1 is a schematic side view of part of a printing system according to an embodiment of the invention.

With reference to FIG. 1 of the drawings, a portion of an inkjet printing system 1 according to a preferred embodiment of the invention is shown. FIG. 1 illustrates in particular the following parts or steps of the printing process in the inkjet printing system 1: media pre-treatment, image formation, drying and fixing and optionally post treatment. Each of these will be discussed briefly below.

FIG. 1 shows that a sheet S of a receiving medium or print medium, in particular a machine coated print medium, is transported or conveyed along a transport path P of the system 1 with the aid of transport mechanism 2 in a direction indicated by arrows P. The transport mechanism 2 may comprise a driven belt system having one or more endless belt 3. Alternatively, the belt(s) 3 may be exchanged for one or more drums. The transport mechanism 2 may be suitably configured depending on the requirements of the sheet transport in each step of the printing process (e.g. sheet registration accuracy) and may hence comprise multiple driven belts and/or multiple drums. For a proper conveyance of the sheets S of the receiving medium or print medium, the sheets S should be fixed to or held by the transport mechanism 2. The manner of such fixation is not limited and may, for example, be selected from the group: electrostatic fixation, mechanical fixation (e.g. clamping) and vacuum fixation, of which vacuum fixation is particularly preferred.

Media Pre-Treatment

To improve spreading and pinning (i.e. fixation of pigments and water-dispersed polymer particles) of the ink on the print medium, in particular on slow absorbing media, such as machine coated media, the print medium may be pre-treated, i.e. treated prior to the printing of an image on the medium. The pre-treatment step may comprise one or more of the following:

(i) pre-heating of the print medium to enhance spreading of the ink used on the print medium and/or to enhance absorption into the print medium of the ink used;

(ii) primer pre-treatment for increasing the surface tension of print medium in order to improve the wettability of the print medium by the ink used and to control the stability of the dispersed solid fraction of the ink composition, i.e. pigments and dispersed polymer particles; (N.B. primer pre-treatment can be performed in a gas phase, e.g. with gaseous acids such as hydrochloric acid, sulphuric acid, acetic acid, phosphoric acid and lactic acid, or in a liquid phase by coating the print medium with a pre-treatment liquid. A pre-treatment liquid may include water as a solvent, one or more co-solvents, additives such as surfactants, and at least one compound selected from a polyvalent metal salt, an acid and a cationic resin); and (iii) corona or plasma treatment.

FIG. 1 illustrates that the sheet S of print medium may be conveyed to and passed through a first pre-treatment module 4, which module may comprise a preheater, (e.g. a radiation heater), a corona/plasma treatment unit, a gaseous acid treatment unit or a combination of any of these. Subsequently, a predetermined quantity of the pre-treatment liquid may optionally be applied on a surface of the print medium via a pre-treatment liquid applying device 5. Specifically, the pre-treatment liquid is provided from a storage tank 6 to the pre-treatment liquid applying device 5, which comprises double rollers 7, 7'. A surface of the double rollers 7, 7' may be covered with a porous material, such as sponge. After providing the pre-treatment liquid to auxiliary roller 7' first, the pre-treatment liquid is transferred to main roller 7, and a predetermined quantity is applied onto the surface of the print medium. Thereafter, the coated printing medium (e.g. paper) onto which the pre-treatment liquid was applied may optionally be heated and dried by a dryer device 8, which comprises a dryer heater installed at a position downstream of the pre-treatment liquid applying device 5 in order to reduce the quantity of water content in the pre-treatment liquid to a predetermined range. It is preferable to decrease the water content in an amount of 1.0 weight % to 30 weight % based on the total water content in the pre-treatment liquid provided on the print medium sheet S. To prevent the transport mechanism 2 from being contaminated with pre-treatment liquid, a cleaning unit (not shown) may be installed and/or the transport mechanism 2 may include a plurality of belts or drums, as noted above. The latter measure avoids or prevents contamination of other parts of the printing system 1, particularly of the transport mechanism 2 in the printing region.

It will be appreciated that any conventionally known methods can be used to apply the pre-treatment liquid. Specific examples of an application technique include: roller coating (as shown), ink-jet application, curtain coating and spray coating. There is no specific restriction in the number of times the pre-treatment liquid may be applied. It may be applied just one time, or it may be applied two times or more. An application twice or more may be preferable, as cockling of the coated print medium can be prevented and the film formed by the surface pre-treatment liquid will produce a uniform dry surface with no wrinkles after application twice or more. A coating device 5 that employs one or more rollers 7, 7' is desirable because this technique does not need to take ejection properties into consideration and it can apply the pre-treatment liquid homogeneously to a print medium. In addition, the amount of the pre-treatment liquid applied with a roller or with other means can be suitably adjusted by controlling one or more of: the physical properties of the pre-treatment liquid, the contact pressure of the roller, and the rotational speed of the roller in the coating device. An application area of the pre-treatment liquid may be only that portion of the sheet S to be printed, or an entire surface of a print portion and/or a non-print portion. However, when the pre-treatment liquid is applied only to a print portion, unevenness may occur between the application area and a non-application area caused by swelling of cellulose contained in coated printing paper with water from the pre-treatment liquid followed by drying. From a view-point of uniform drying, it is thus preferable to apply a pre-treatment liquid to the entire surface of a coated printing paper, and roller coating can be preferably used as a coating method to the whole surface. The pre-treatment liquid may be an aqueous liquid.

Corona or plasma treatment may be used as a pre-treatment step by exposing a sheet of a print medium to corona discharge or plasma treatment. In particular, when used on media such as polyethylene (PE) films, polypropylene (PP) films, polyethylene terephthalate (PET) films and machine coated media, the adhesion and spreading of the ink can be improved by increasing the surface energy of the medium. With machine coated media, the absorption of water can be promoted which may induce faster fixation of the image and less puddling on the print medium. Surface properties of the print medium may be tuned by using different gases or gas mixtures as medium in the corona or plasma treatment. Examples of such gases include: air, oxygen, nitrogen, carbon dioxide, methane, fluorine gas, argon, neon, and mixtures thereof. Corona treatment in air is most preferred.

Image Formation

When employing an inkjet printer loaded with inkjet inks, the image formation is typically performed in a manner whereby ink droplets are ejected from inkjet heads onto a print medium based on digital signals. Although both single-pass inkjet printing and multi-pass (i.e. scanning) inkjet printing may be used for image formation, single-pass inkjet printing is preferable as it is effective to perform high-speed printing. Single-pass inkjet printing is an inkjet printing method with which ink droplets are deposited onto the print medium to form all pixels of the image in a single passage of the print medium through the image forming device, i.e. beneath an inkjet marking module.

Referring to FIG. 1, after pre-treatment, the sheet S of print medium is conveyed on the transport belt 3 to an image forming device or inkjet marking module 9, where image formation is carried out by ejecting ink from inkjet marking device 91, 92, 93, 94 arranged so that a whole width of the sheet S is covered. That is, the image forming device 9 comprises an inkjet marking module having four inkjet marking devices 91, 92, 93, 94, each being configured and arranged to eject an ink of a different colour (e.g. Cyan, Magenta, Yellow and Black). Such an inkjet marking device 91, 92, 93, 94 for use in single-pass inkjet printing typically has a length corresponding to at least a width of a desired printing range Ra (i.e. indicated by the double-headed arrow on sheet S), with the printing range Ra being perpendicular to the media transport direction D.

Figure 2:
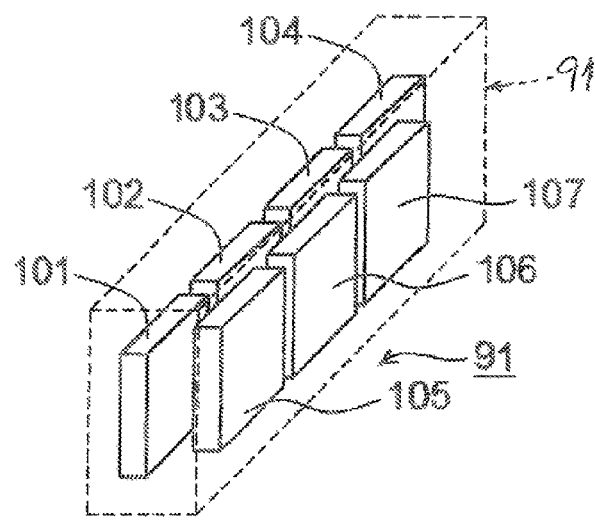
FIG. 2 is a schematic perspective view of an image forming device in the printing system of FIG. 1.
Figure 3A:
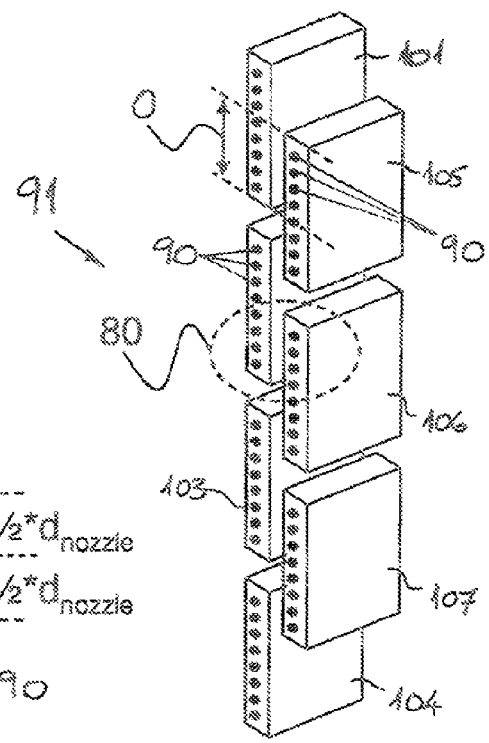
FIG. 3A is a schematic perspective underside view of printing heads in the image forming device of FIG. 2.
Figure 3B:
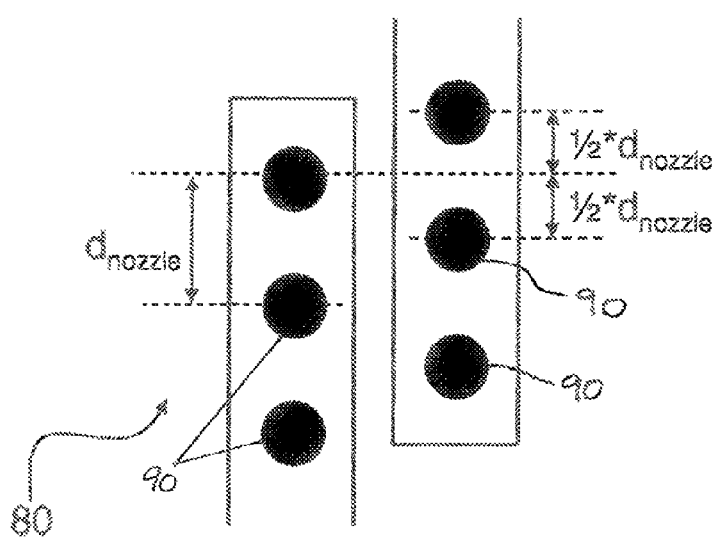
FIG. 3B is a detailed view of the printing heads in the image forming device of FIG. 2 and FIG. 3A.

Each inkjet marking device 91, 92, 93, 94 may have a single print head having a length corresponding to the desired printing range Ra. Alternatively, as shown in FIG. 2, the inkjet marking device 91 may be constructed by combining two or more inkjet heads or printing heads 101-107, such that a combined length of individual inkjet heads covers the entire width of the printing range Ra. Such a construction of the inkjet marking device 91 is termed a page wide array (PWA) of print heads. As shown in FIG. 2, the inkjet marking device 91 (and the others 92, 93, 94 may be identical) comprises seven individual inkjet heads 101-107 arranged in two parallel rows, with a first row having four inkjet heads 101-104 and a second row having three inkjet heads 105-107 arranged in a staggered configuration with respect to the inkjet heads 101-104 of the first row. The staggered arrangement provides a page-wide array of inkjet nozzles 90, which nozzles are substantially equidistant in the length direction of the inkjet marking device 91. The staggered configuration may also provide a redundancy of nozzles in an area O where the inkjet heads of the first row and the second row overlap. (See in FIG. 3A). The staggering of the nozzles 90 may further be used to decrease an effective nozzle pitch d (and hence increasing print resolution) in the length direction of the inkjet marking device 91. In particular, the inkjet heads are arranged such that positions of the nozzles 90 of the inkjet heads 105-107 in the second row are shifted in the length direction of the inkjet marking device 91 by half the nozzle pitch d, the nozzle pitch d being the distance between adjacent nozzles 90 in an inkjet head 101-107. (See FIG. 3B, which shows a detailed view of 80 in FIG. 3A). The nozzle pitch d of each head is, for example, about 360 dpi, where "dpi" indicates a number of dots per 2.54 cm (i.e. dots per inch). The resolution may be further increased by using more rows of inkjet heads, each of which are arranged such that the positions of the nozzles of each row are shifted in the length direction with respect to the positions of the nozzles of all other rows.

In the process of image formation by ejecting ink, an inkjet head or a printing head employed may be an on-demand type or a continuous type inkjet head. As an ink ejection system, an electrical-mechanical conversion system (e.g. a single-cavity type, a double-cavity type, a bender type, a piston type, a shear mode type, or a shared wall type) or an electrical-thermal conversion system (e.g. a thermal inkjet type, or a Bubble Jet® type) may be employed. Among them, it is preferable to use a piezo type inkjet recording head which has nozzles of a diameter of 30 µm or less in the current image forming method.

The image formation via the inkjet marking module 9 may optionally be carried out while the sheet S of print medium is temperature controlled. For this purpose, a temperature control device 10 may be arranged to control the temperature of the surface of the transport mechanism 2 (e.g. belt or drum 3) below the inkjet marking module 9. The temperature control device 10 may be used to control the surface temperature of the sheet S within a predetermined range, for example in the range of 30° C. to 60° C. The temperature control device 10 may comprise one or more heaters, e.g. radiation heaters, and/or a cooling means, for example a cold blast, in order to control and maintain the surface temperature of the print medium within the desired range. During and/or after printing, the print medium is conveyed or transported downstream through the inkjet marking module 9.

Drying and Fixing

After an image has been formed on the print medium, the printed ink must be dried and the image must be fixed on the print medium. Drying comprises evaporation of solvents, and particularly those solvents having poor absorption characteristics with respect to the selected print medium.

FIG. 1 of the drawings schematically shows a drying and fixing unit 11, which may comprise one or more heater, for example a radiation heater. After an image has been formed on the print medium sheet S, the sheet S is conveyed to and passed through the drying and fixing unit 11. The ink on the sheet S is heated such that any solvent present in the printed image (e.g. to a large extent water) evaporates. The speed of evaporation, and hence the speed of drying, may be enhanced by increasing the air refresh rate in the drying and fixing unit 11. Simultaneously, film formation of the ink occurs, because the prints are heated to a temperature above the minimum film formation temperature (MFT). The residence time of the sheet S in the drying and fixing unit 11 and the temperature at which the drying and fixing unit 11 operates are optimized, such that when the sheet S leaves the drying and fixing unit 11 a dry and robust image has been obtained. As described above, the transport mechanism 2 in the fixing and drying unit 11 may be separate from the transport mechanism 2 of the pre-treatment and printing parts or sections of the printing system 1 and may comprise a belt or a drum.

Post Treatment

To improve or enhance the robustness of a printed image or other properties, such as gloss level, the sheet S may be post treated, which is an optional step in the printing process. For example, in a preferred embodiment, the printed sheets S may be post-treated by laminating the print image. That is, the post-treatment may include a step of applying (e.g. by jetting) a post-treatment liquid onto a surface of the coating layer, onto which the ink has been applied, so as to form a transparent protective layer over the printed recording medium. In the post-treatment step, the post-treatment liquid may be applied over the entire surface of an image on the print medium or it may be applied only to specific portions of the surface of an image. The method of applying the post-treatment liquid is not particularly limited, and may be selected from various methods depending on the type of the post-treatment liquid. However, the same method as used in coating the pre-treatment liquid or an inkjet printing method is preferable. Of these, an inkjet printing method is particularly preferable in view of: (i) avoiding contact between the printed image and the post-treatment liquid applicator; (ii) the construction of an inkjet recording apparatus used; and (iii) the storage stability of the post-treatment liquid. In the post-treatment step, a post-treatment liquid containing a transparent resin may be applied on the surface of a formed image so that a dry adhesion amount of the post-treatment liquid is 0.5 g/m$^2$ to 10 g/m$^2$, preferably 2 g/m$^2$ to 8 g/m$^2$, thereby to form a protective layer on the recording medium.

If the dry adhesion amount is less than 0.5 g/m$^2$, little or no improvement in image quality (image density, colour saturation, glossiness and fixability) may be obtained. If the dry adhesion amount is greater than 10 g/m$^2$, on the other hand, this can be disadvantageous from the view-point of cost efficiency, because the dryness of the protective layer degrades and the effect of improving the image quality is saturated.

As a post-treatment liquid, an aqueous solution comprising components capable of forming a transparent protective layer over the print medium sheet S (e.g. a water-dispersible resin, a surfactant, water, and other additives as required) is preferably used. The water-dispersible resin in the post-treatment liquid preferably has a glass transition temperature (Tg) of −30° C. or higher, and more preferably in the range of −20° C. to 100° C. The minimum film forming temperature (MFT) of the water-dispersible resin is preferably 50° C. or lower, and more preferably 35° C. or lower. The water-dispersible resin is preferably radiation curable to improve the glossiness and fixability of the image. As the water-dispersible resin, for example, any one or more of an acrylic resin, a styrene-acrylic resin, a urethane resin, an acryl-silicone resin, a fluorine resin or the like, is preferably employed. The water-dispersible resin can be suitably selected from the same materials as that used for the inkjet ink. The amount of the water-dispersible resin contained, as a solid content, in the protective layer is preferably 1% by mass to 50% by mass. The surfactant used in the post-treatment liquid is not particularly limited and may be suitably selected from those used in the inkjet ink. Examples of the other components of the post-treatment liquid include antifungal agents, antifoaming agents, and pH adjustors.

Hitherto, the printing process was described such that the image formation step was performed in-line with the pre-treatment step (e.g. application of an (aqueous) pre-treatment liquid) and a drying and fixing step, all performed by the same apparatus, as shown in FIG. 1. However, the printing system 1 and the associated printing process are not restricted to the above-mentioned embodiment. A system and method are also contemplated in which two or more machines are connected through a transport mechanism 2, such as a belt conveyor, drum conveyor or a roller, and the step of applying a pre-treatment liquid, the (optional) step of drying a coating solution, the step of ejecting an inkjet ink to form an image and the step or drying an fixing the printed image are performed separately. Nevertheless, it is preferable to carry out the image formation with the above defined in-line image forming method and printing system 1.

Defect Detection

With reference now to FIG. 4 of the drawings, the inkjet printing system 1 according to the preferred embodiment of the invention is shown to include an apparatus 20 for detecting defects in the printing system 1, and particularly for identifying and for classifying deformations D in the sheets S of print medium when the sheets S are on the transport path P of the printing system 1. In this particular embodiment, the apparatus 20 comprises a sentry unit 21, which processes the sheets S on the transport path P before those sheets S enter the image forming device 9. In this regard, it will be noted that the printing system 1 in FIG. 4 has a transport path P which includes both a simplex path P$_S$ and a duplex path P$_D$ and the sentry unit 21 of the apparatus 20 is arranged such that sheets S input on the simplex path P$_S$ and also returning from the duplex path P$_D$ all pass via the sentry unit 21.

A sensor device 22 in the form of an optical sensor, such as a laser scanner, is provided within the sentry unit 21 for sensing the surface geometry or topology of the sheets S as they travel on a first pass or a second pass along the transport path P. The laser scanner or optical sensor device 22 generates digital image data I of the three-dimensional surface geometry or topology of each sheet S sensed or scanned. The sheet topology data from the sensor device 22 is then transmitted (e.g. either via a cable connection or wirelessly) to a controller 23 which includes a processor device 24 for processing and analysing the digital image data I to detect and to classify any defect or deformation D in the surface geometry or topology of each sheet S sensed or scanned. The controller 23 and processor device 24 may be integrated within the sentry unit 21 or may be separately or remotely located. The sentry unit 21 is desirably arranged to scan the sheets S for detecting and measuring any defects or deformations D before the sheets S enter the image forming device or marking module 9.

Processing of the Data

In a first processing step, a binary image is created where every pixel exceeding the preset height threshold given by TOL is set to 1, all other pixels are set to 0. The minimum threshold level for detecting defects is preferably set to 400 μm, as it has been found that a lower level will result in detection of too many very small defects. The processor device 24 produces a height map for each sheet. This height map is used to detect and measure or classify any defects present within the sheet, and particularly any out-of-plane deformations D, such as wrinkles, dog ears, curl, tears etc. In this embodiment, a defect is defined as a measurement point within the height map having at least 4 connected neighbors also exceeding a preset threshold value.

Figure 5:
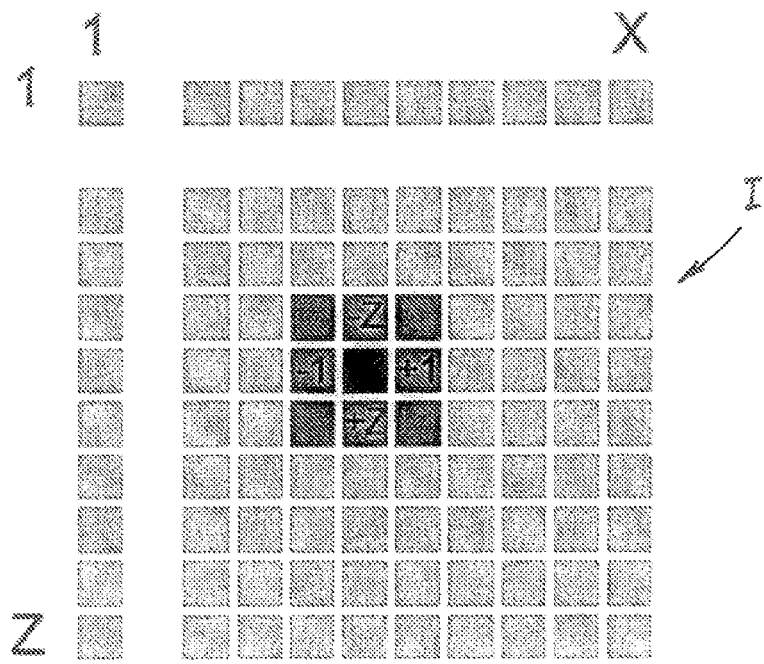
FIG. 5 is a schematic illustration of the analysis of an eight connected pixel neighbourhood in a preferred embodiment of the apparatus and method of the invention.

The defect analysis algorithm makes use of linear indexing for addressing the image content. This is convenient since all neighbour pixel locations can easily be determined by simply adding or subtracting a value from the current index. Each position in the image can be addressed as Image (i*Z+j) where i=1 . . . Z and j=1 . . . X. Addressing the four directly connected neighbors by offsets to the index is visualized in FIG. 5. Indeed, as shown in FIG. 5, an eight connected neighborhood is used for the defect analysis or extraction, i.e. the corners are included. Thus, one of the steps in finding pixels that are part of the defect includes generating a pixel list of all neighbouring pixels of pixels known to form a part of the defect. As this algorithm can return the same index multiple times, however, it is desirable for this list of indices to be cleaned by removing all duplicate indices. This prevents unnecessary calculations and multiple inclusions of the same data, which would otherwise cause errors in the calculation of defect properties. The function used to determine whether a pixel forms part of the defect is combined within this filter step. The algorithm used for removing double entries uses a simple approach, which may not offer the highest performance. However, as the number of defects within a sheet S is limited and the number of pixels within a defect is usually small, this approach does not consume too much calculation time. Otherwise a filter function using a hash algorithm may offer higher performance.

Figure 6:
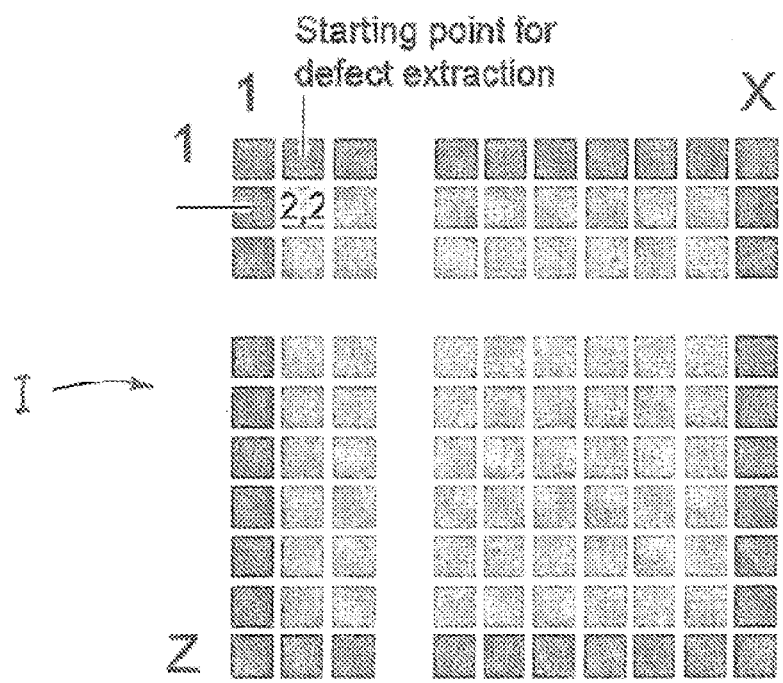
FIG. 6 is a schematic illustration of pixels on edges of the image data which are assigned a value below the defect threshold before the analysis process starts.

With reference to FIG. 6, the image pixels on the image edges are assigned a value below the defect threshold before the defect analysis process starts to prevent generation of invalid indices. The defect anaylsis or extraction thus starts at image element 2,2. By virtue of this value assignment, an image element on the edges of the height map will never be assigned to a defect area and the algorithm will never try to index its neighbors. Thus, in order to avoid defects D at an edge of the sheet S not being measured or classified correctly, the edge of the sheet S should not be located at the edge of the image. As an alternative the size of the image containing the height map could be increased by one pixel at all sides containing a value less than the threshold value for defect extraction.

Figure 7:
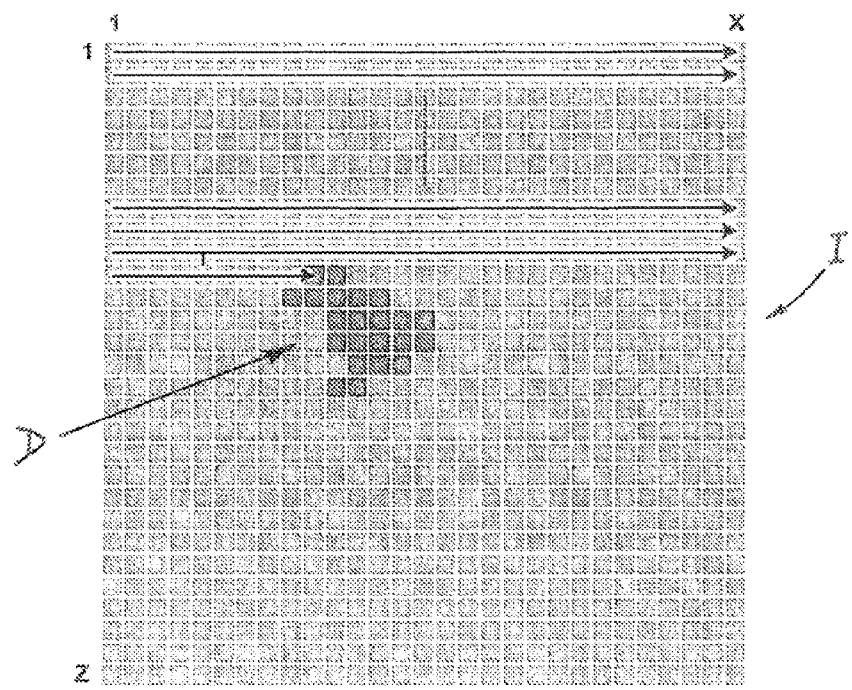
FIG. 7 is a schematic illustration of the image data in the embodiment of the apparatus and method of the invention being analysed by row major until a data pixel representing a deformation is found, at which point all of the pixel neighbours are assessed.
Figure 8:
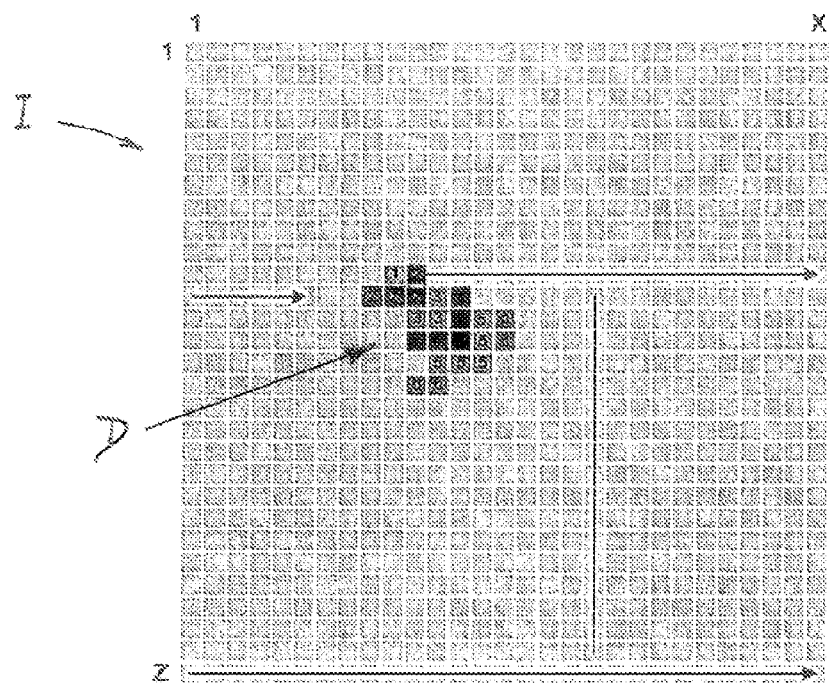
FIG. 8 is a schematic illustration of the image data in FIG. 5, with the pixel neighbours within the deformation analysed, the numbers indicating the iteration steps, and the analysis for new defects continuing when all pixels within the deformation have been found.

Referring to FIG. 7, the image pixel data from the sensor device 22 is analysed by the processor 24 row-by-row or "row major" until a defect pixel is detected. Starting at this point, all immediately adjacent or neighbouring pixels are then tested to see if they belong to the defect, as shown in FIG. 8. The neighbouring pixels within the defect are tested, with the pixel numbering in FIG. 8 indicating the iteration steps. Further analysing the image pixel data row-by-row for new defects then continues when all pixels within a defect or deformation D have been found. To perform a measurement and classification of a defect D and/or for later statistical analysis of the defects, the following defect properties are assessed:

Maximum Height: The highest point within the defect

Defect Area: The area A is equal to the number of pixels that belong to the defect or deformation D, which is the sum of the unique pixels found during each iteration of the defect search algorithm.

Bounding Box: The bounding box is identified by the top left Z, X coordinates and width in both directions Centre of gravity: is given by:

$$R = \frac{1}{M}\sum_{i=1}^{n} m_i r_i$$

where

M is the accumulated height (total mass) of the defect, $m_i$ is the height of individual pixels within the defect, and $r_i$ is the pixel coordinates (z, x)

Figure 9:
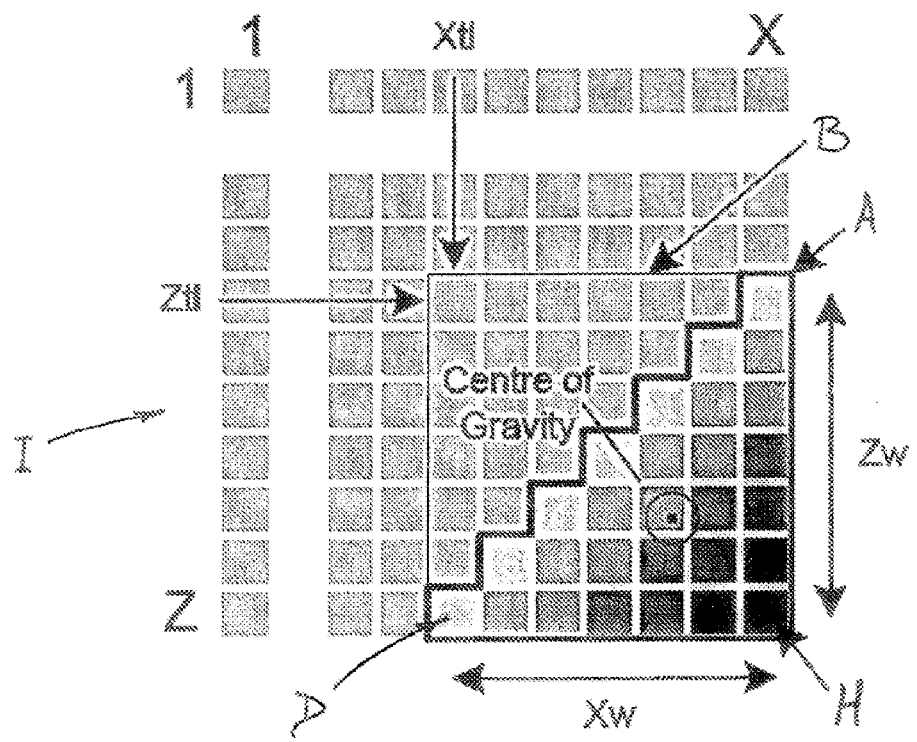
FIG. 9 is a schematic illustration of various properties for a dog-ear type of sheet deformation.

With reference to FIG. 9 of the drawings, the properties for a dog ear type of defect are illustrated. These properties for the dog-ear defect include: a maximum height H located at corner of bounding box B, a centre of gravity located near a diagonal of the bounding box B, and an area A of approximately 50% of bounding box area.

The defect properties belonging to the current defect being processed are updated each time a new list of neighbour pixels has been found. Since the properties are quite simple the processing is straight-forward. The most 'complex' property is the centre-of-gravity. During the defect extraction the sum of the individual Z and X and total weights is calculated. After all pixels belonging to the defect have been found, the centre-of-gravity can be calculated from these three values. During the defect analysis or extraction process, the defect properties are determined for all defects found. When the analysis for a specific defect is finished its characteristics can be used to determine whether the defect is to be included in the defect list or not. The characteristics for a maximum of e.g. 20 defects may be stored. Defects detected having an area of less than 10 pixels may be neglected as these are most likely just noise elements or the fringes of a real defect. Fringe defects are mainly caused by noise within the height map. Most fringe defect areas are smaller than 3 pixels. The largest fringe defect area may be 7 pixels in area. Thus, the defect area will be used to report defects only when their area is equal to or greater than 10 pixels.

Another approach for the elimination of small defects may be to filter the image before defect analysis. There are several options for doing this, including:

(i) Removing all defects containing less than a predefined number of pixels The drawback is that a defect first needs to be identified, so performing this operation separately will consume more processing time.

(ii) Performing a dilation operation before defect detection. This can help to 'remove' small fringe defects. Such fringe defects are merged into a larger defect.

(iii) Performing an erosion operation before defect analysis or detection. This can remove small defects. The maximum size of the defects that will effectively be removed is determined by the size and shape of the erosion kernel. It is not yet clear if the small fringe type defects will be removed. The larger the filter kernel the more processing time is needed.

Print System Control

After the image data I has been analysed and the defects or deformations D within the sheet S have been extract and classified accordingly, the controller 23 may transmit a control signal (either via cable or wirelessly) to an ejector device 25 for regulating the conveyance of the sheets S to the image forming device or marking module 9. In particular, if the sheet S has been determined by the processor 24 to include one or more deformations D with a size or extent above a predetermined threshold sufficient to render the sheet unsuitable for printing, the controller 23 is configured to control the ejector device 25 to remove or eject the sheet S from the transport path P to a reject tray 26. In this way, sheet jams within the print module or image forming device 9 may be avoided when sheets S are found to contain too much deformation. In principle, the control of the ejector device 25 can be based solely on the maximum allowable deformation size or magnitude to perform its job. However, information gathered on deformation of the sheet S may also be used for statistical purposes to determine media runability, and for statistical purposes more information is useful, such as number of deformed areas (defects) present within a sheet, the area of each defect etc. The classification data may be stored in, and retrieved from, the controller 23 for further analysis.

Figure 10:
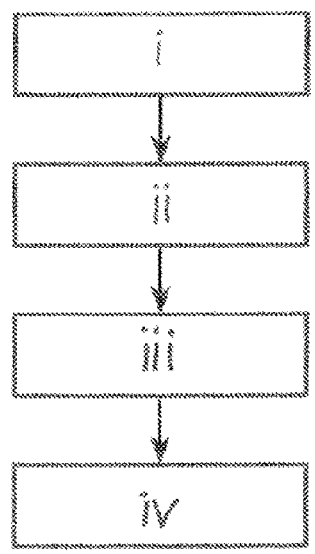
FIG. 10 is a flow diagram which schematically illustrates a method according to a preferred embodiment.

Finally, referring now to FIG. 10 of the drawings, a flow diagram is shown that schematically illustrates the steps in a method of detecting defects in a printing system 1 according to the preferred embodiment of the invention described above with respect to FIGS. 1 to 9. In this regard, the first box i of FIG. 10 represents the step of feeding or conveying a sheet S of paper or another print medium along a transport path of the printing system. The second box ii then represents the step of sensing a surface geometry or a topology of the sheet S of print medium via a sensing device 23 (e.g. a laser scanner) to generate image data I representative of that surface geometry or topology. In step ii the sensor device generates the height map data, which is then send to the processor device for analysis. The third box iii then represents the analysis step of processing the height map data I generated in the sensing step to detect and classify deformations D sheet S. Step iii comprises the sub-step of determining the at least one property of the deformation and the sub-step of classifying the deformation with respect to a plurality of deformation classes by means of the at least one property of the deformation. The final box iv in FIG. 10 of the drawings then represents the step of determining a suitability of the sheet S for printing in the system 1 based upon the deformations D detected and classified in the surface geometry or topology of the sheet S. In step iv the suitability of the sheet is determined by the deformation class wherein the deformation has been classified. This may, for example, include assessing whether a detected deformation D and/or distribution exceeds a threshold size to render the sheet S unsuitable for printing. The method in step i to iv can be repeated for the other side of to be duplex printed sheet. Also, the steps i to iv can be repeated for additional sheets, wherein the sheet information for each sheet is stored in a memory unit. Furthermore step iv might comprise the step of determining a root cause by comparing the deformation property or properties and/or the deformation distribution to root cause related information in a database or memory unit for identifying a root cause by which deformations are generations.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. An apparatus for defect detection in a printing system, comprising:
a sensor device for sensing a surface of a sheet to be printed and for generating data representing a height map of the sheet; and
a processor device for processing the data from the sensor device, wherein the processor device is configured:
to analyse the height map to detect a presence of a deformation in the sheet;
when a deformation is detected, to determine at least one property of the deformation;
to classify the deformation with respect to a plurality of deformation classes by means of the at least one property of the deformation;
to determine a suitability of the sheet for printing based on the deformation class in which the deformation has been classified.

2. An apparatus according to claim 1, wherein the processor device is further arranged to determine a suitability of the sheet for printing based on at least one property of the deformation or the deformation class of the deformation.

3. An apparatus according to claim 1, wherein the processor device is further arranged to:

when a plurality of deformations is detected, to determine at least one property for each of the plurality of deformations;

to classify the plurality of deformations with respect to the plurality of deformation classes by means of the at least one property of each of the plurality of deformations;

to determine a suitability of the sheet for printing based on the plurality of deformation classes in which the deformations have been classified.

4. An apparatus according to claim 1, wherein the processor device is arranged to classify the deformation by respectively comparing the at least one property of the deformation to at least one predetermined reference corresponding to a deformation class.

5. An apparatus according to claim 4, wherein the processor device is further configured:

when a deformation is detected, to determine a plurality of properties of the deformation;

to classify the deformation with respect to a plurality of deformation classes by respectively comparing each of the plurality of properties of the deformation to a plurality of predetermined references of at least one of the plurality of deformation classes, wherein each of the plurality of deformation classes is uniquely identifiable by means of its corresponding plurality of references.

6. An apparatus according to claim 1, wherein the processor device is arranged for determining the suitability of the sheet by comparing the at least one property of the deformation or the plurality of deformation classes in which the deformations have been classified to at least one threshold value.

7. An apparatus according to claim 1, further comprising a memory unit for storing sheet information related to a sensed sheet, comprising:

data representing a height map of the sheet;

values for the at least one property determined for the sheet;

the plurality of deformation classes in which the deformations have been classified for the sheet;

pass information representative of a path taken and/or to be taken by the sheet through the printing system, information identifying the trajectory of a sensed sheet for a simplex or duplex printing of the sheet;

at least one predetermined reference corresponding respectively at least one property;

at least one algorithm for classifying a deformation based on its at least one determined property;

at least one threshold value;

operating conditions related to treatment of the sheet; and/or information relating to the at least one property of the deformation and/or the plurality of deformation classes in which the deformations have been classified to one or more root causes.

8. An apparatus according to claim 7, wherein the processor device is arranged to connect to the memory unit to analyse sheet information for a plurality of sensed sheets.

9. An apparatus according to claim 3, wherein the processor device is arranged to emit a signal for identifying of a root cause based on the at least one property of the deformations and the plurality of deformation classes in which the deformations have been classified.

10. An apparatus according to claim 1, wherein the plurality of deformations classes comprises at least one selected from the group comprising wrinkles, dog ears, curl, and tears.

11. An apparatus according to claim 1, wherein the at least one property comprises at least one selected from the group comprising maximum height, defect area, bounding box, and center of gravity for a deformation.

12. An apparatus according to claim 1, wherein the sensor device is arranged to:

sense a first surface geometry of the sheet when the sheet is on a first pass of the transport path towards an image forming unit of the printing system for generating first pass data representing the height map of the sheet;

to sense a second surface geometry of the sheet when the sheet is on a second pass of the transport path towards the image forming of the printing system for generating second pass data representing the height map of the sheet; and wherein the processing device is arranged for comparing the second pass data to the first pass data.

13. An apparatus according to claim 12, wherein the first pass data is representative of a height map of a first side of the sheet, and wherein the second pass data is representative of a height map of a second side of the sheet.

14. An apparatus according to claim 12, wherein the processor device is arranged to:

compare the properties of the deformations and the plurality of deformation classes in which the deformations have been classified determined from the first and second pass data to one another; and preferably to emit a signal indicative of a difference in the one or more properties of the deformations and the plurality of deformation classes in which the deformations have been classified determined from the first and second pass data with respect to one another.

15. A method of detecting defects in a printing system, comprising:

sensing a surface geometry of a sheet to be printed to generate data representing a height map of the sheet;

analysing the height map to detect a presence of a deformation in the sheet;

when a deformation is detected, determining at least one property of the deformation;

classifying the deformation with respect to a plurality of deformation classes by means of the at least one property of the deformation;

determining a suitability of the sheet for printing based on the deformation class in which the deformation has been classified.

* * * * *